United States Patent
Lee (10) Patent No.: US 8,150,485 B2
(45) Date of Patent: Apr. 3, 2012

(54) CASING AND PORTABLE TERMINAL HAVING THE SAME

(75) Inventor: Young-Hwan Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 893 days.

(21) Appl. No.: 12/193,904

(22) Filed: Aug. 19, 2008

(65) Prior Publication Data
US 2009/0124308 A1    May 14, 2009

(30) Foreign Application Priority Data

Nov. 9, 2007   (KR) .................... 10-2007-0114426

(51) Int. Cl.
*H04M 1/00*    (2006.01)

(52) U.S. Cl. ............ 455/575.7; 455/572; 455/575.5; 379/428.01

(58) Field of Classification Search ........... 455/550.1, 455/556.1, 556.2, 572, 575.1, 575.3, 575.5, 455/575.7; 379/428.01, 440
See application file for complete search history.

(56) References Cited

U.S. PATENT DOCUMENTS

| 7,673,745 B2 * | 3/2010 | Sirichai et al. ............ 206/45.23 |
| 2006/0164800 A1 * | 7/2006 | McEwan et al. ............ 361/683 |

* cited by examiner

*Primary Examiner* — Nhan Le (74) *Attorney, Agent, or Firm* — Birch, Stewart, Kolasch & Birch, LLP (57) ABSTRACT

A casing for a portable terminal is provided. The casing includes a first portion configured to replace a rear cover of a portable terminal so as to provide an exterior surface of the portable terminal, a second portion connected to the first portion, and an electronic component located at the second portion, the electronic component being connectable to the portable terminal to provide at least one function associated with the portable terminal.

24 Claims, 10 Drawing Sheets

CASING AND PORTABLE TERMINAL HAVING THE SAME

CROSS-REFERENCE TO RELATED APPLICATIONS

This application claims priority to Korean Application No. 10-2007-0114426, filed Nov. 9, 2007, which is herein incorporated by reference in its entirety.

BACKGROUND OF THE INVENTION

1. Field of the Invention

The present invention relates to a casing and a portable terminal having a casing detachably coupled to a main body of the portable terminal.

2. Description of Related Art

Portable terminals can be easily carried and provide one or more functions, such as supporting voice and/or telephony calls, inputting and/or outputting information, storing data and the like. Portable terminals have also become multifunctional devices, such that some portable terminal are configured to capture still images or moving images, play music or video files, play games, receive broadcast, and the like. As more of these functions are incorporated into portable terminals, the resulting portable terminals have become integrated multi-media devices.

Various approaches for providing multi-media devices have focused on providing additional hardware or software in order to implement such complicated functions. For example, a user interface environment is provided to allow users to easily and conveniently retrieve or select functions. However, because these devices are portable terminals, it is difficult to mount elements which support, for example, input/output functions, such as a user interface, without interfering with the portability of the portable terminals. In other words, as more functionality is added to the portable terminals, the components that provide such functionality compete for space inside the portable terminal.

In addition, a portable terminal is also seen as an expression of the individual and therefore the aesthetic of the portable terminal is important to manly users. Therefore, it is important that the various functions of the portable terminal are seamlessly integrated, while providing a portable terminal with wide appeal to users.

BRIEF SUMMARY OF THE INVENTION

Therefore, an object of the present invention is to provide a casing having a different shape from that of the related art and a portable terminal having the same.

Another object of the present invention is to provide various functions to the portable terminal or extend existing functions of the portable terminal by using the casing.

Still another object of the present invention is to allow the casing to partially form an appearance of the portable terminal (or a main body) such that the casing can appear to be a part of the portable terminal.

Still another object of the present invention is to provide the portable terminal in various shapes to account for different users' tastes.

To achieve these and other advantages and in accordance with the purpose of the present invention, as embodied and broadly described herein, there is provided a casing for a portable terminal, the casing having a first portion configured to replace a rear cover of a portable terminal so as to provide an exterior surface of the portable terminal, a second portion connected to the first portion, and an electronic component located at the second portion, the electronic component being connectable to the portable terminal to provide at least one function associated with the portable terminal.

In accordance with another aspect of the present invention, there is provided a casing for a portable terminal, the casing having a first portion configured to replace a rear cover of a portable terminal so as to provide an exterior surface of the portable terminal, and a terminal portion provided at the first portion, the terminal portion being configured to communicate with a terminal of the portable terminal that is exposed only upon removal of the rear cover.

In accordance with yet another aspect of the present invention, there is provided a casing for a portable terminal, the casing having a first portion configured to replace a rear cover of a portable terminal so as to provide all exterior surface of the portable terminal, an interposal portion provided at the perimeter of the first portion to detachably couple the first portion to the portable terminal, the interposal portion being interposed between the first portion and the portable terminal when the first portion is coupled to the portable terminal, and a strap detachably coupled to one of the first portion and the interposal portion.

In accordance with a different aspect of the present invention, there is provided a portable terminal having a main body having a rear portion, the rear portion including an internal terminal, and a casing detachably coupled to the main body at the rear portion. The casing includes a first portion that defines an exterior surface of the portable terminal, and a terminal portion connected to the internal terminal of the portable terminal, the internal terminal of the portable terminal being exposed only when the casing is detached from the main body.

Further scope of applicability of the present application will become more apparent from the detailed description given hereinafter. However, it should be understood that the detailed description and specific examples, while indicating different exemplary embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments of the invention and together with the description serve to explain the principles of the invention. In the drawings.

DETAILED DESCRIPTION OF THE INVENTION

Description will now be given in detail various exemplary embodiments of portable terminals in relation to the present invention, with reference to the accompanying drawings. Where possible, the same or similar reference numerals will be used to identify the same or similar configurations of the various exemplary embodiments, without repeating the specific details of the same or similar configurations. While the exemplary embodiments of the present invention will be described with reference to a bar-type portable terminal, the present invention is applicable to other configurations, such as slide type portable terminals, folder type portable terminals, swing type portable terminals, and the like.

Figure 1:
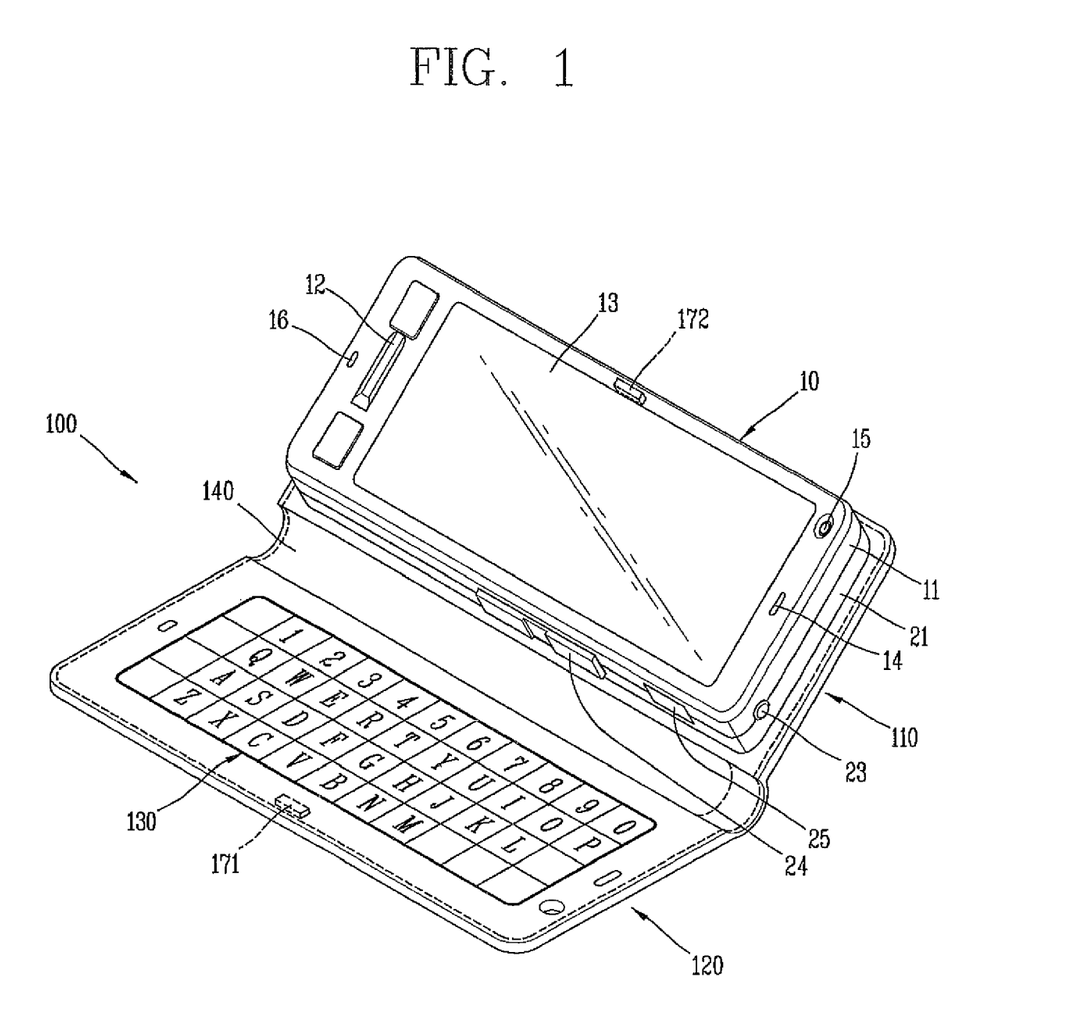
FIG. 1 is a perspective view showing a front surface of a portable terminal with a casing in accordance with one exemplary embodiment of the present invention.

FIG. 1 is a perspective view showing a front surface of a portable terminal 10 having a casing 100 in accordance with one exemplary embodiment of the present invention. A case (housing, cover, or the like) defining an appearance of a main body of the portable terminal 10 includes a front case 11 and a rear case 21. Various electronic components are mounted in spaces provided by the front and rear cases 11 and 21. At least one intermediate case may be additionally disposed between the front case 11 and the rear case 21. Such cases may be formed of synthetic resin that is injected or molded, or formed of a metal, such as stainless steel (STS) or titanium (Ti) or the like.

The front case 11 includes a first manipulating portion 12, a display 13, a first audio (sound) output unit 14, a first image input unit 15, an audio (sound) input unit 16, and the like. The first manipulating portion 12 may be configured to receive a command for controlling operations of the portable terminal 10. The display 13 may include a liquid crystal display (LCD) module, an organic light emitting diodes (OLED) module, or the like, or any other suitable display capable of represent information. The display 13 may further include a touch screen or touch pad such that a user can touch the display 13 to input information. The first audio output unit 14 may be a receiver or a speaker. The first image input unit 15 may be a camera module for capturing still images or moving images. The audio input unit 16 may be a microphone for receiving a user's voice, other various sounds, and the like.

The rear case 21 mounted to a rear surface of the portable terminal 10 includes a broadcast signal receiving antenna 23, a second manipulating portion 24, all interface 25, and the like. The broadcast signal receiving antenna 23 may be arranged at one side of the rear case 21 in addition to an antenna for call communications or the like. The broadcast signal receiving antenna 23 may be disposed in the rear case 21 to be extendable from the main body of the portable terminal. The second manipulating portion 24 may be disposed at a side surface of the rear case 21. The second manipulating portion 24, as well as the first manipulating portion 12, may be all referred to as a manipulating portion. The manipulating portion can be configured to operate in a tactile manner or any manner that a user may physically manipulate the manipulating portion. For example, the manipulating portion may be implemented as a dome switch, a touchpad, or a touch screen, which a user can push or touch to input commands or information. Alternatively, the manipulating portion may be implemented as wheel, jog switch, or joystick operated in a rotational manner.

From a functional perspective, the first manipulating portion 12 may be configured to provide a menu input) such as start, end, check (OK), or the like, whereas the second manipulating portion 24 may act as a hot-key for performing a specific function, such as an activation of the first image input unit 15, as well as a scroll function.

The interface 25 may serve as a data path which allows the portable terminal to exchange data with external devices. For example, the interface 25 may be used in a wired or wireless manner, and may be at least one of a connection terminal to which an earphone is connected, or a port for a local communication (e.g., infrared data (IrDA) port, BLUETOOTH port, wireless LAN port, or the like). The interface 25 may be a card socket for receiving an external card such as a Subscriber Identification Module (SIM), a User Identity Module (UIM) or a memory card for storing information, or the like. The interface may also be used as a connection terminal to receive power from a power supply terminal.

The casing 100 coupled to the portable terminal 10 may include a first portion 110, which accommodates the portable terminal 10 therein, and a second portion 120 on which an electronic component 130 is mounted. The first and second portions 110 and 120 may be formed of a material (e.g., leather or the like) which is different from that of the portable terminal 10, such that they can provide different aesthetic effects when coupled to the portable terminal 10.

The first and second portions 110 and 120 may be foldably connected to each other by a connecting portion 140. In a folded state (see FIG. 6), the second portion 120 is disposed substantially in parallel with the first portion 110 while covering the front case 11 of the portable terminal 10. In an unfolded state, as shown in FIG. 1, the first portion 110 and the second portion 120 form all obtuse angle therebetween. The casing 100 will be described in more detail later with reference to FIG. 3.

Figure 2:
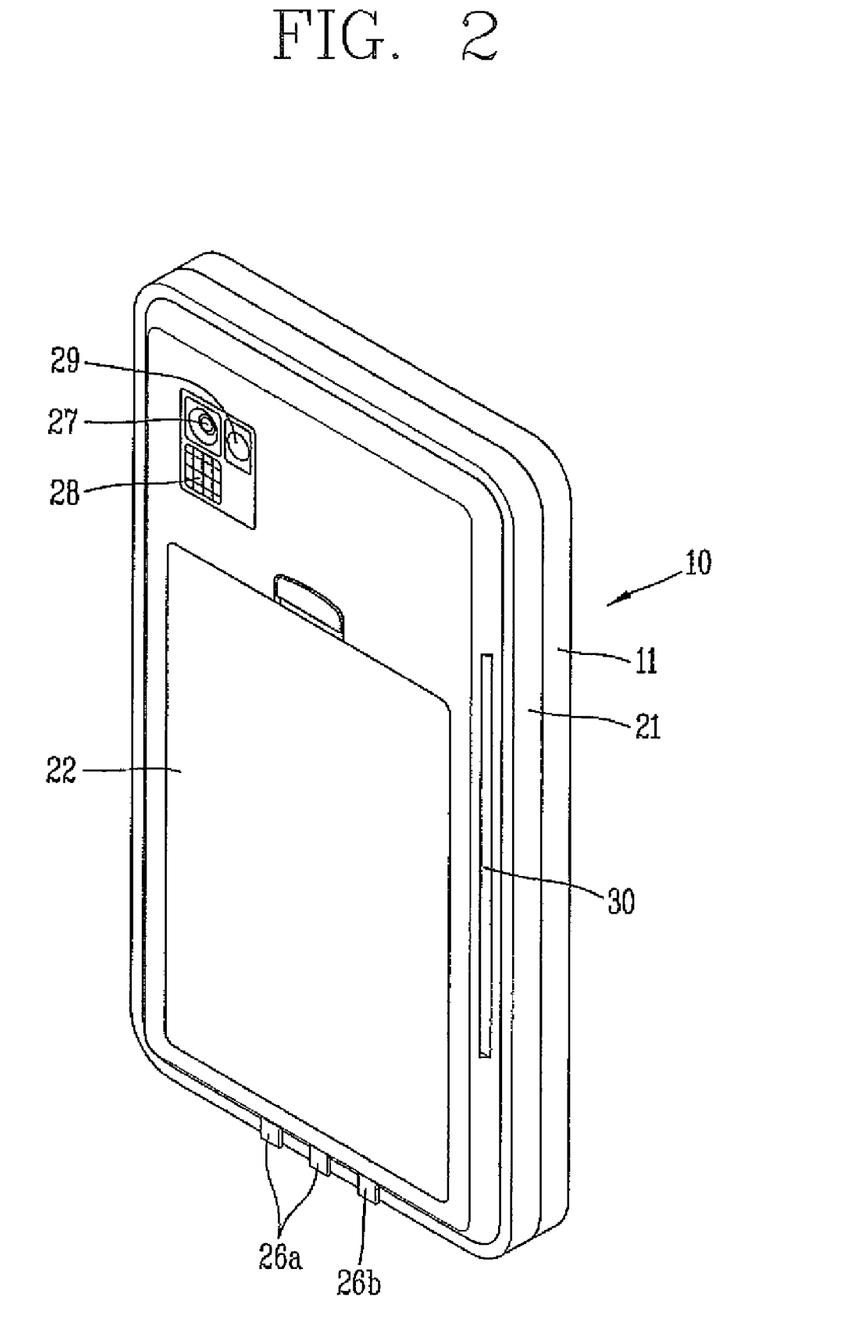
FIG. 2 is a perspective view showing a rear surface of the portable terminal of FIG. 1.

FIG. 2 is a perspective view of a rear surface of the portable terminal in FIG. 1. As shown in FIG. 2, the rear case 21 may further include a power supplying unit 22, a second image input unit 27, and the like.

The power supplying unit 22 may be mounted in the rear case 21 to supply power to the portable terminal 10. The power supplying unit 22 may be a rechargeable battery, for example, so as to be detachably coupled to the rear case 21. Power source terminals 26a may be arranged adjacent to the power supplying unit 22. The power source terminals 26a are electrically connected to the power supplying unit 22. In addition to the power source terminals 26a, a data terminal 26b may be formed at the rear case 21.

The second image input unit 27 has an image capturing direction substantially opposite to that of the first image input unit (refer to 15 in FIG. 1), and also may be implemented as a camera with a different number of pixels from the first image input unit 15. For example, preferably, the first image input unit 15 may have a small number of pixels such that a user can capture his own still or moving images so as to easily send (transmit) to another party during telephony calls or the like, and the second image input unit 27 has a large number of pixels because a user may desire to use this image input unit 27 to photograph images of general objects to be captured, which are not intended to be immediately sent via telephony calls. Additionally, near the second image input unit 27, a flash 28 and a mirror 29 are disposed. The flash 28 irradiates light toward an object to be captured when the second image input unit 27 is used. The mirror 29 may be used for a user to view his face or the like when the user desires to capture his own images using the second image input unit 27.

A first coupling member 30 may be formed as a groove at a side surface of a portion relatively protruded from the rear case 21. The groove may be disposed to be coupled to the casing 100.

While it has been described above that the first manipulating portion 12 and the like are disposed at the front case 11 and the second manipulating portion 24 and the like are disposed at the rear case 21, they are not limited to such positions. For example, the second manipulating portion 24 may be disposed at the front case 11 to be adjacent to the first manipulating portion 12. In addition, even though the second image input unit 27 is separately provided, the first image input unit 15 may be rotatably configured so as to provide the capturing direction of the second image input unit 27.

Figure 3:
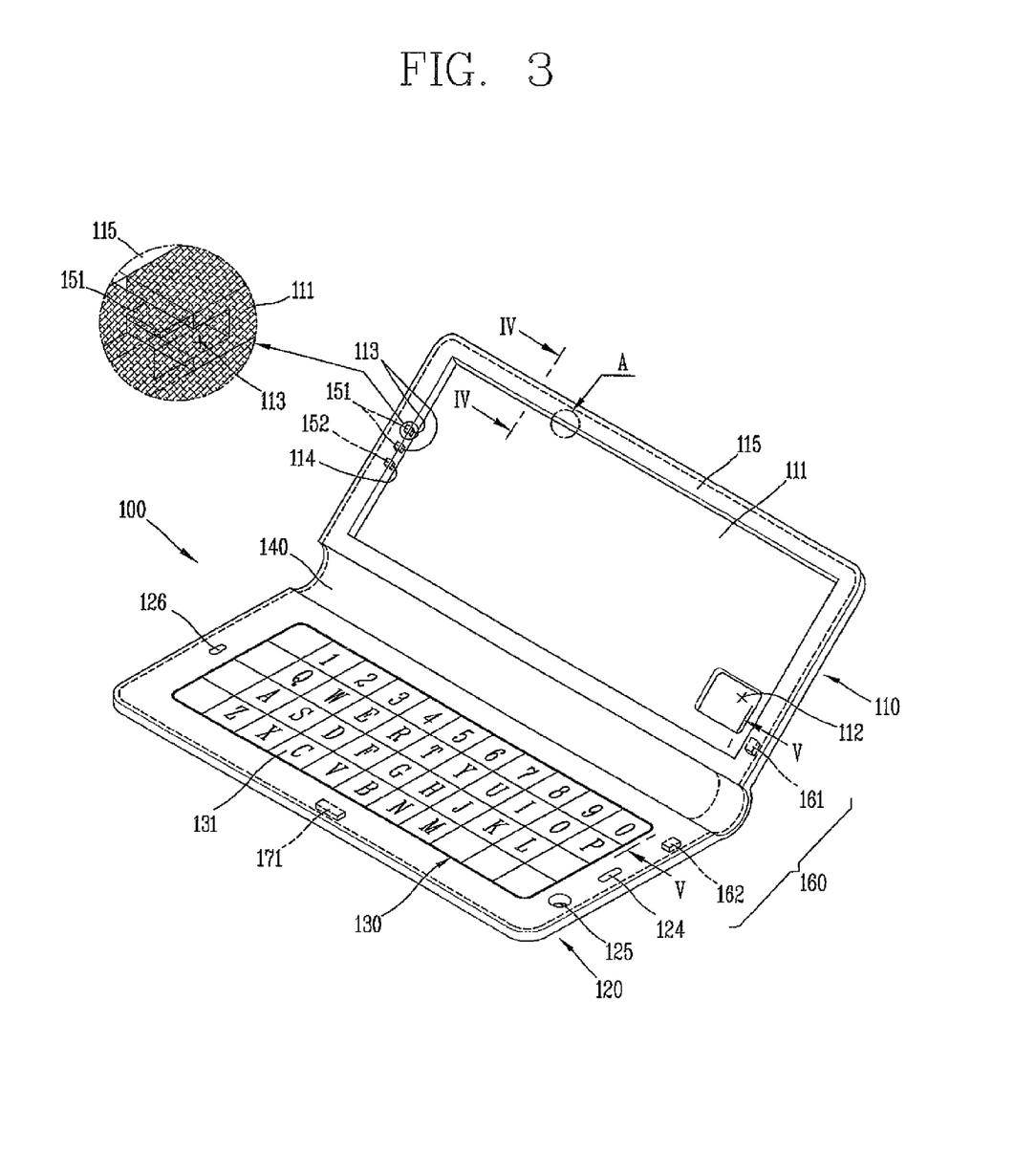
FIG. 3 is a perspective view showing the casing of FIG. 1 in an open (unfolded) state.

FIG. 3 is a perspective view showing an unfolded state of the casing 100 of FIG. 1. As shown in FIG. 3, the first portion 110 of the casing 100 includes a cover portion 111 for receiving the portable terminal 10 therein, and an interposal portion 115 interposed between the cover portion 111 and the portable terminal 10 when the casing 100 is coupled to the portable terminal 10. The cover portion 111 may be referred to as a battery cover portion in terms of being coupled to the portable terminal 10 so as to cover the power supplying unit or battery 22 (see FIG. 2). The battery cover portion 111 has a communication opening or image opening 112 to allow the second image input unit (refer to 27 of FIG. 2) or the like to communicate with the exterior. Also, power source holes 113 and a data hole 114 may be formed at one portion of the battery cover portion 111 to correspond with the power source terminals and the data terminal (refer to 26a and 26b in FIG. 2). Corresponding with the power source holes 113 and the data hole 114, the power source terminals 151 and the data terminal 152 may be disposed in the interposal portion 115 to be connectable to the power source terminals and the data terminal, respectively. The power source terminals 151 and the data terminal 152 may be electrically connected to the electronic component 130 so as to perform power exchange and data exchange therewith.

The interposal portion 115 may extend along an outer circumference of the battery cover portion 111, so as to have a substantially annular (ring) shape. If the interposal portion 115 is formed of the same material as the second portion 120, such as leather, it can further enhance the aesthetic effect of the casing 100, as well as advantageously decrease the level of shock provided to the main body of the portable terminal 10 if the portable terminal 10 is dropped or struck. The interposal portion 115 may be further coated with a glossy material such as chrome, thereby allowing the interposal portion 115 to be more visually distinguished from the main body of the portable terminal 10.

The second portion 120 of the casing 100 may be provided with the electronic component 130. As one example of the electronic component 130, a QWERTY type keypad is shown in the drawing. A plurality of keys having a similar arrangement to that of keys on a keyboard for a computer may be arranged on a key area 131 of the QWERTY type keypad. Surrounding the key area 131, the second portion 120 may have a plurality of communication openings 124, 125, and 126 corresponding to other components of the portable terminal 10 that communicate with the exterior. The communication openings 124, 125, and 126 may include an audio output opening 124 for the first audio output unit 14, an image opening 125 corresponding to the first image input unit 15, an audio input opening 126 opened for the audio input unit 16, and the like. Even in the folded state of the casing 100, such components (i.e., 14, 15 and 16) are not restricted from use.

The casing 100 may further be provided with a state detecting unit 160 for detecting a folded state or unfolded state of the casing 100. The state detecting unit 160 may include a first element 161 and a second element 162 respectively disposed at the first portion 110 and the second portion 120. The state detecting unit 160 may be configured using different approaches, for example, in an optical manner, a magnetic manner, or the like. The state detecting unit 160 detects the state of the casing 100 according to how close the first and second elements 161 and 162 are positioned each other. For example, if the first element 161 is a magnet, the second element 162 is a hall IC. Accordingly, the state of the casing 100 can be detected by flux change depending on how close the two elements 161 and 162 are positioned each other.

Fixing portions 171 and 172 may also be provided to keep the casing 100 in the folded state. The fixing portions 171 and 172, for example, may be a magnet 171 disposed on the second portion 120, and a metal (refer to 172 of FIG. 1) disposed on the portable terminal 10. Depending on a magnetic attraction between the fixing portions 171 and 172, the second portion 120 can be kept in a state of being in contact with the front case 11 of the portable terminal 10 in the folded state of the casing 100.

While this exemplary embodiment of the present invention shows the power holes 113 and data hole 114 provided on a bottom edge to correspond to the bottom edge of portable terminal 10, the holes 113 and 114 can be provided on any edge depending on the location of the power supply terminals 26a and the data terminal 26b.

Figure 3A:
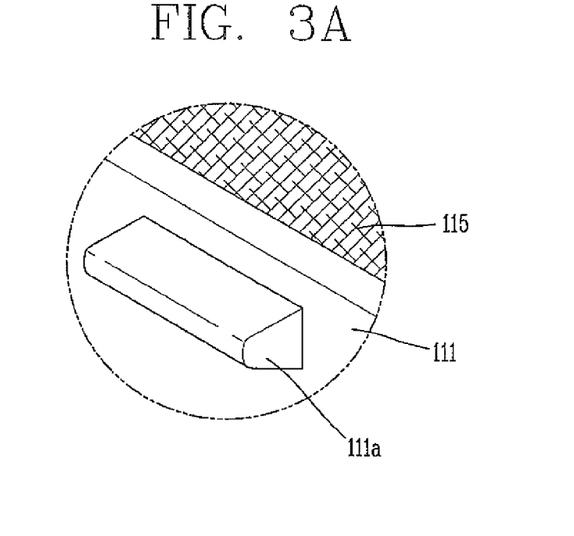
FIG. 3A is a detailed view of a portion of the casing of FIG. 1 at call-out A.
Figure 4:
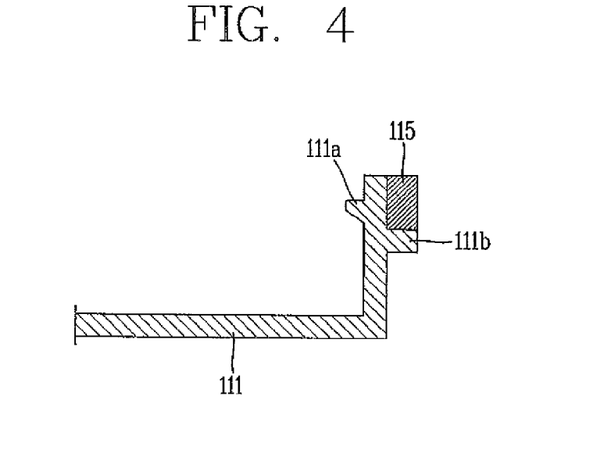
FIG. 4 is a cross-sectional view taken along the line IV-IV of FIG. 3.

FIG. 4 is a cross-sectional view taken along the line IV-IV of FIG. 3. As shown in FIG. 4, a free end of the battery cover portion 111 may include a second coupling portion 111a in the form of a protrusion that is connectable with the first coupling portion (refer to 30 of FIG. 1) of the portable terminal 10. The second coupling portion 111a may be one continuous member that cooperates with the first coupling portion 30 or a series of small projections 111a as shown in FIG. 3A. The first and second coupling portions 30 and 111a may also be implemented using other configurations, for example, the combination of a magnet and conductor, so long as they can couple the casing 100 to the portable terminal 10 with a certain level of coupling force and additionally allow the casing 100 to be separated from the portable terminal 10. A supporting portion 111b may protrude from an outer surface of the battery cover portion 111. The interposal portion 115 may be disposed at a spacing limited by the supporting portion 111b and the battery cover portion 111. The interposal portion 115 may also be fixedly coupled to the battery cover portion 111 in a manner of applying an adhesive onto the supporting portion 111b or the like.

Figure 5:
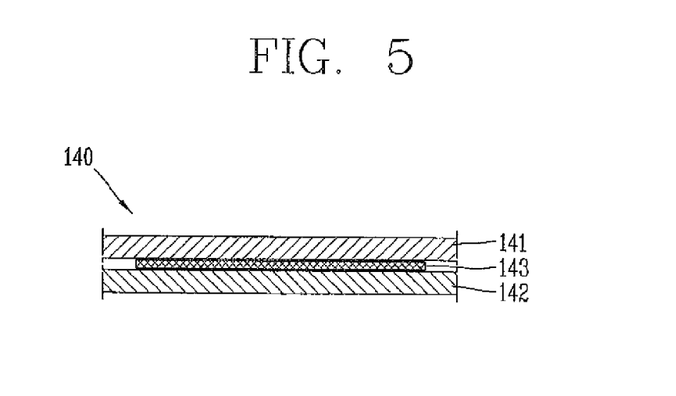
FIG. 5 is a cross-sectional view taken along the line V-V of FIG. 3.

FIG. 5 is a cross-sectional view taken along the line V-V of FIG. 3, where the casing 100 has been laid flat. As shown in FIG. 5, the connecting portion 140 may include a first member 141 and a second member 142. The first and second members 141 and 142 may be two sheets of leather connected to the second portion 120 and the interposal portion 115. The two sheets of leather may be backstitched to each other using thread, and a reinforcing member 143 may be disposed between the two sheets of leather before backstitching them together. The reinforcing member 143 may be implemented as paper, such as hardboard. The provision of the reinforcing member 143 is advantageous in reducing the chance of or preventing a collapse (deformation) of the connecting portion 140 due to the weight of the casing 100, even when the user operates the electronic component 130 while grabbing the second portion 120 in the unfolded state of the casing 100.

Figure 6:
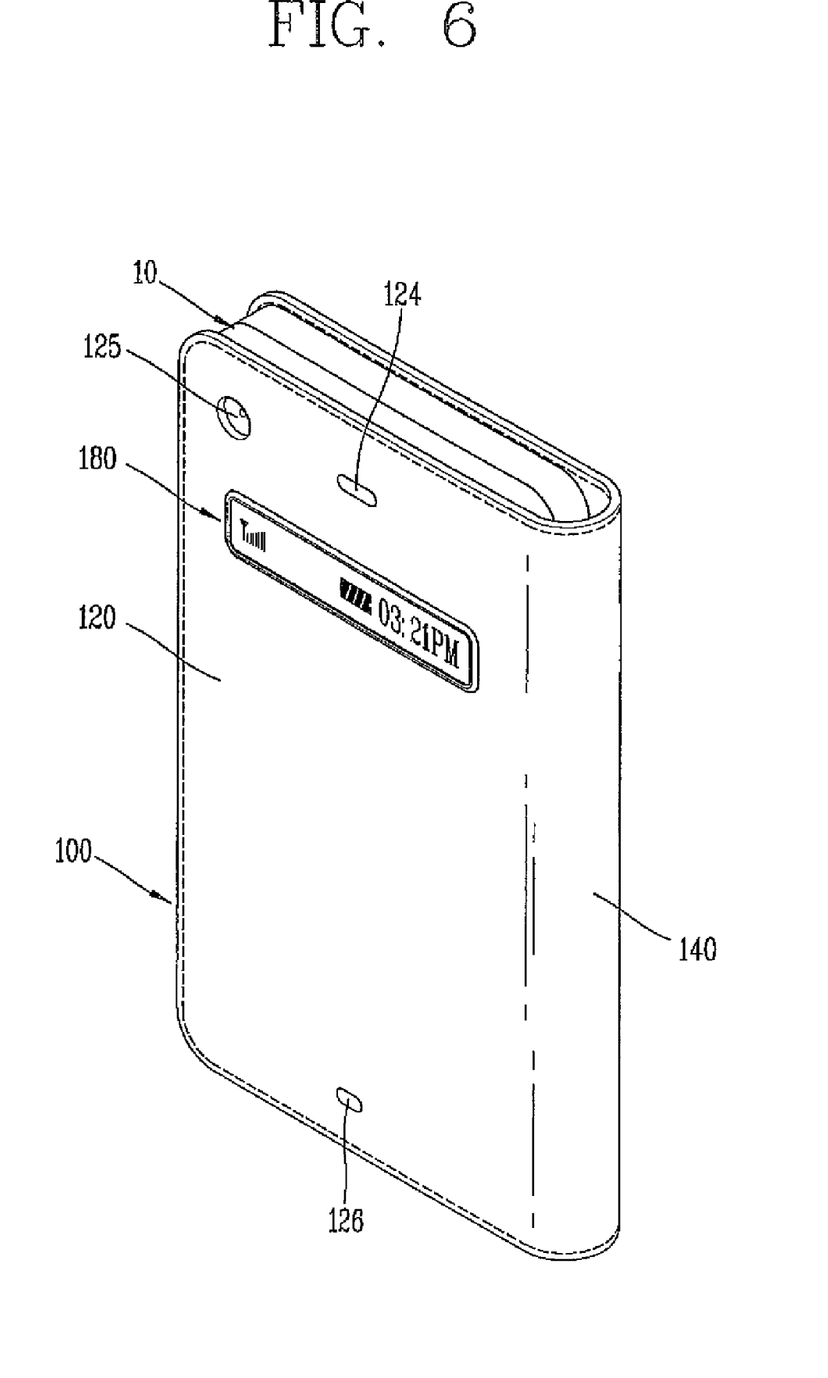
FIG. 6 is a perspective view showing a closed state of a second portion of the casing of FIG. 1.

FIG. 6 is a perspective view showing the folded state of the second portion 120 of FIG. 1. As shown in FIG. 6, the second portion 120 folded at the connecting portion 140 to be positioned substantially parallel to the first portion 110, thereby covering the front side of the portable terminal 10. An auxiliary display 180 may additionally be provided on an outer surface of the second portion 120. The auxiliary display 180 is small in size to occupy a relatively small area of the second portion 120. The auxiliary display 180 may be employed to display small amounts of information, for example, wave transmission/reception state, battery charge (level) information, current time, and the like.

Operation of the casing 100 according to the first exemplary embodiment will now be described. The user couples the casing 100 to the portable terminal 10 to allow the user to conveniently use the input function of the portable terminal 10. For example, when the electronic component 130 is a QWERTY type keypad, the user can easily compose emails or text messages.

Because the casing 100 is coupled to cover the power supplying unit 22, replacing a rear cover of the portable terminal 10 with the casing 100 and the exchange of the power supplying unit 22 may be done simultaneously, whereby the user is not inconvenienced with the process. The power terminals 26a and 151 are connected to each other and the data terminals 26b and 152 are connected to each other when the casing 100 is coupled to the portable terminal 10. Accordingly, the exchange of power and data therebetween can be achieved without any additional operation.

When the user desires to place a call, the user may select a telephone number displayed on the display 13 in a touching manner or, if in the unfolded state, input the telephone number using the electronic component 130. After the successful call connection, the audio output unit 14 and the audio input unit 16 are accessible to the user via the communication openings 124 and 126 when the casing 100 is in the folded state. While the portable terminal 10 is used for the call communication in the folded state of the casing 130, the folded state may be stably maintained by the fixing portions 171 and 172.

Figure 7:
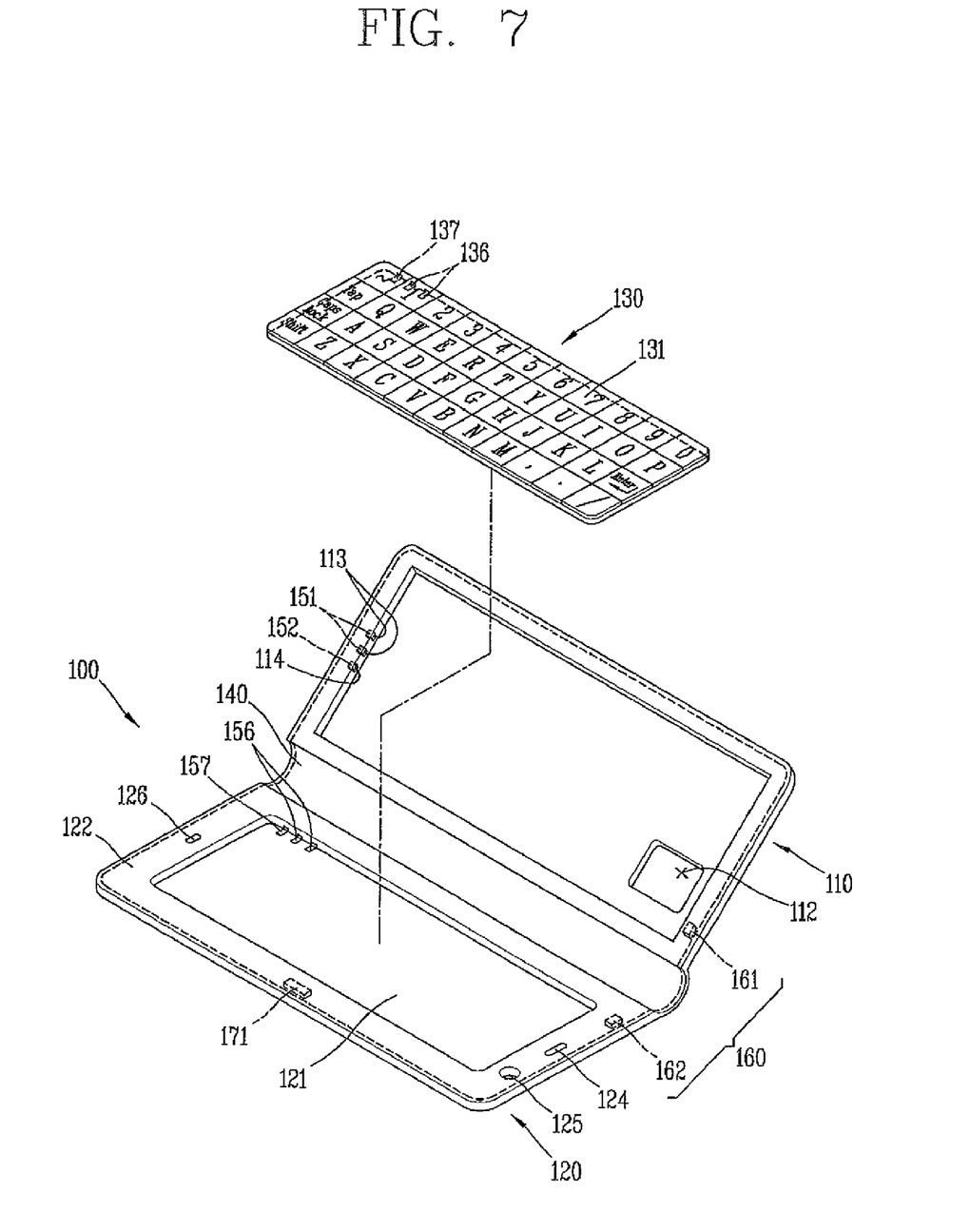
FIG. 7 is an exploded perspective view of the casing of FIG. 3, with an electronic component separated therefrom.

FIG. 7 is an exploded perspective view of the casing 100 of FIG. 3, having the electronic component 130 separated therefrom. As shown in FIG. 7, the electronic component 130 may be detachably mounted to the second portion 120. The second portion 120 may include an accommodating portion 121 in which the electronic component 130 is mounted and an outer circumferential portion 122 having an annular shape to surround the accommodating portion 121. The accommodating portion 121 may be recessed to a certain depth such that when the electronic component 130 is mounted therein, the electronic component 130 is flush with the outer circumferential portion 122.

On an inner wall of the outer circumferential portion 122 defining the accommodating portion 121, power source terminals 156 and a data terminal 157 may be formed. The power source terminals 156 and the data terminal 157 may be electrically connected to the power source terminals 151 and the data terminal 152 of the first portion 110, respectively. Corresponding with the power source terminals 156 and the data terminal 157, power source terminals 136 and a data terminal 137 may be formed on one surface of the electronic component 130. In this manner, power may be transferred or exchanged from the power supplying unit 22 to the electronic component 130 sequentially via the power source terminals 26a, 151, 156 and 136. In addition, data may be exchanged between the portable terminal 10 and the electronic component 130 sequentially via the data terminals 26b, 152, 157 and 137.

If power terminals and data terminal corresponding to the power terminals 156 and the data terminal 157 are provided, the electronic component may be configured to provide additional and/or different functions. For example, the electronic component may be or may include at least one of a biometric information detecting sensor, an auxiliary battery for extending a power supply function of the power supplying unit 22, and an auxiliary antenna for extending a radio transmission/reception function of the portable terminal 10. The casing 100 may be configured such that only the electronic component 130 is replaced without replacing the first and second portions 110 and 120, so as to enable the portable terminal 10 to be reconfigured in various designs.

As described above, the data terminals 152, 157, and 137 are provided for direct contact with the data terminal 26b and are electrically connected together so as to allow data exchange between the portable terminal 10 and the casing 100. However, the data exchange between the portable terminal 10 and the casing 100 can also be achieved by allowing a local radio communication module disposed at the casing 100 to wirelessly communicate with the interface 25 of the portable terminal 10. Whether the portable terminal includes the data terminals 152, 157, and 137, or are provided by a local radio communication module, they may be referred to as casing interface. In addition, the casing interface may further include the power source terminals 26a, 151, 156 and 136. Accordingly, the casing interface can be used as a comprehensive term to also include a device for allowing power and data exchange between the portable terminal 10 and the casing 100.

Figure 8:
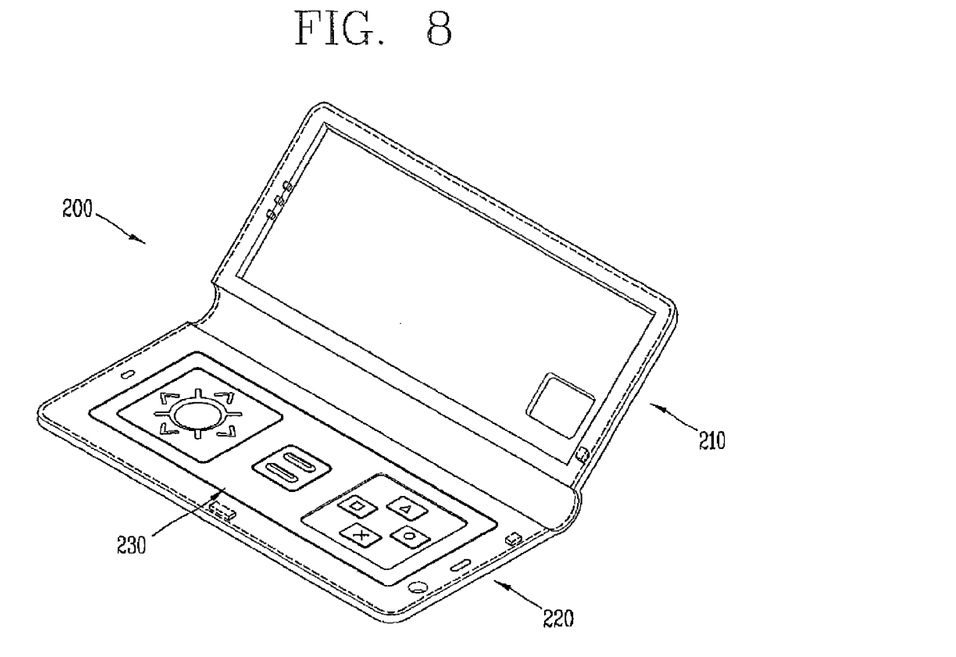
FIGS. 8 to 11 are perspective views showing different types of casings, respectively, in accordance with other exemplary embodiments of the present invention.

FIGS. 8 to 11 are diagrams showing exemplary casings 200 to 500 in accordance with other exemplary embodiments of the present invention. FIG. 8 shows a casing 200 having a gaming keypad 230 as the electronic component, and is appropriate for users who desire to simply play a game using the portable terminal 40.

Figure 9:
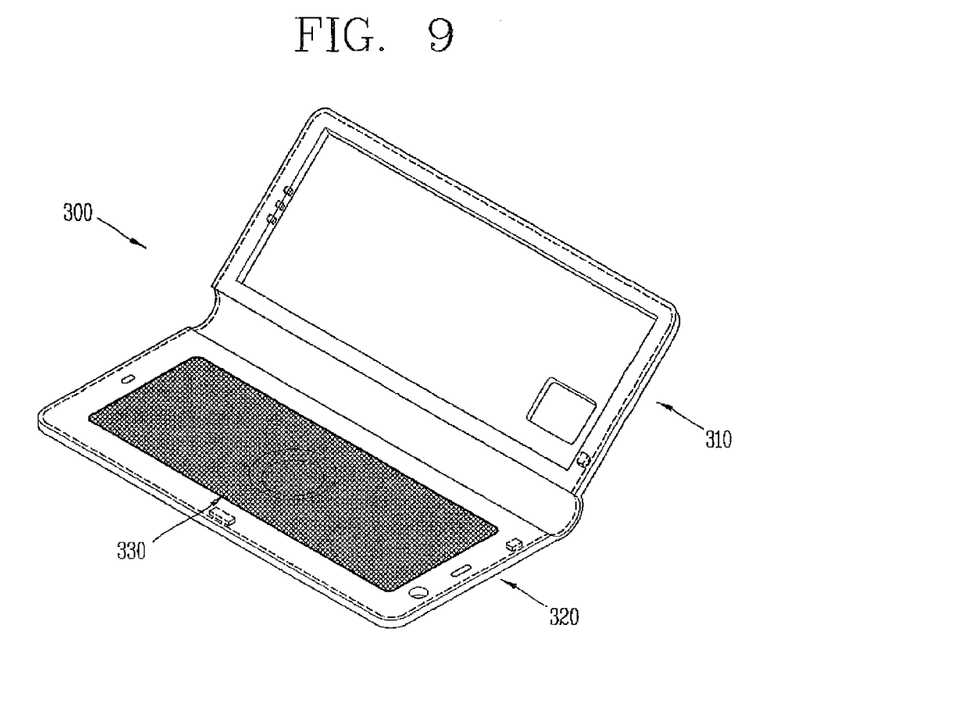

FIG. 9 shows an exemplary casing 300 having an auxiliary speaker 330 as the electronic component. The auxiliary speaker 330 may be appropriate for users who want to listen to music using the portable terminal 10. The auxiliary speaker 330 may implement a stereo function by cooperating with the first audio output unit 14.

Figure 10:
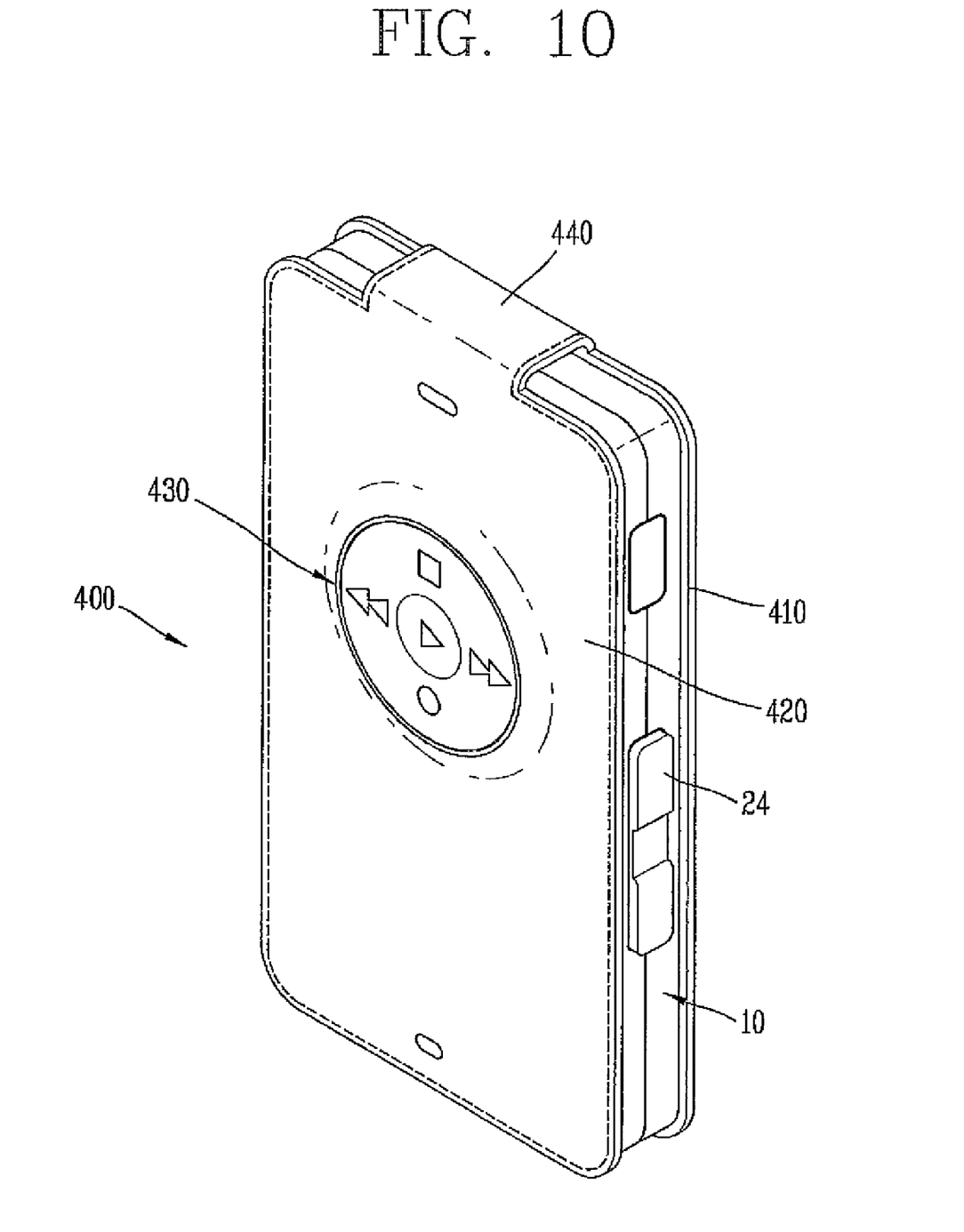

FIG. 10 shows an exemplary casing 400 having a keypad 430 for listening to music as the electronic component. Since the keypad 430 may allow music controls, such as playing, stopping, without needing to see display 13, the keypad 430 may be arranged on an outer surface of a second portion 420. A connecting portion 440 by which a first portion 410 is connected to the second portion 420 allows the second portion 420 to be folded centering on an axis in a widthwise direction of the portable terminal 10, thereby exposing a second manipulating portion 24 and the like. The second manipulating portion 24 allows a user, for example, to change his portable terminal 10 into a call communication mode upon receiving a call.

Figure 11:
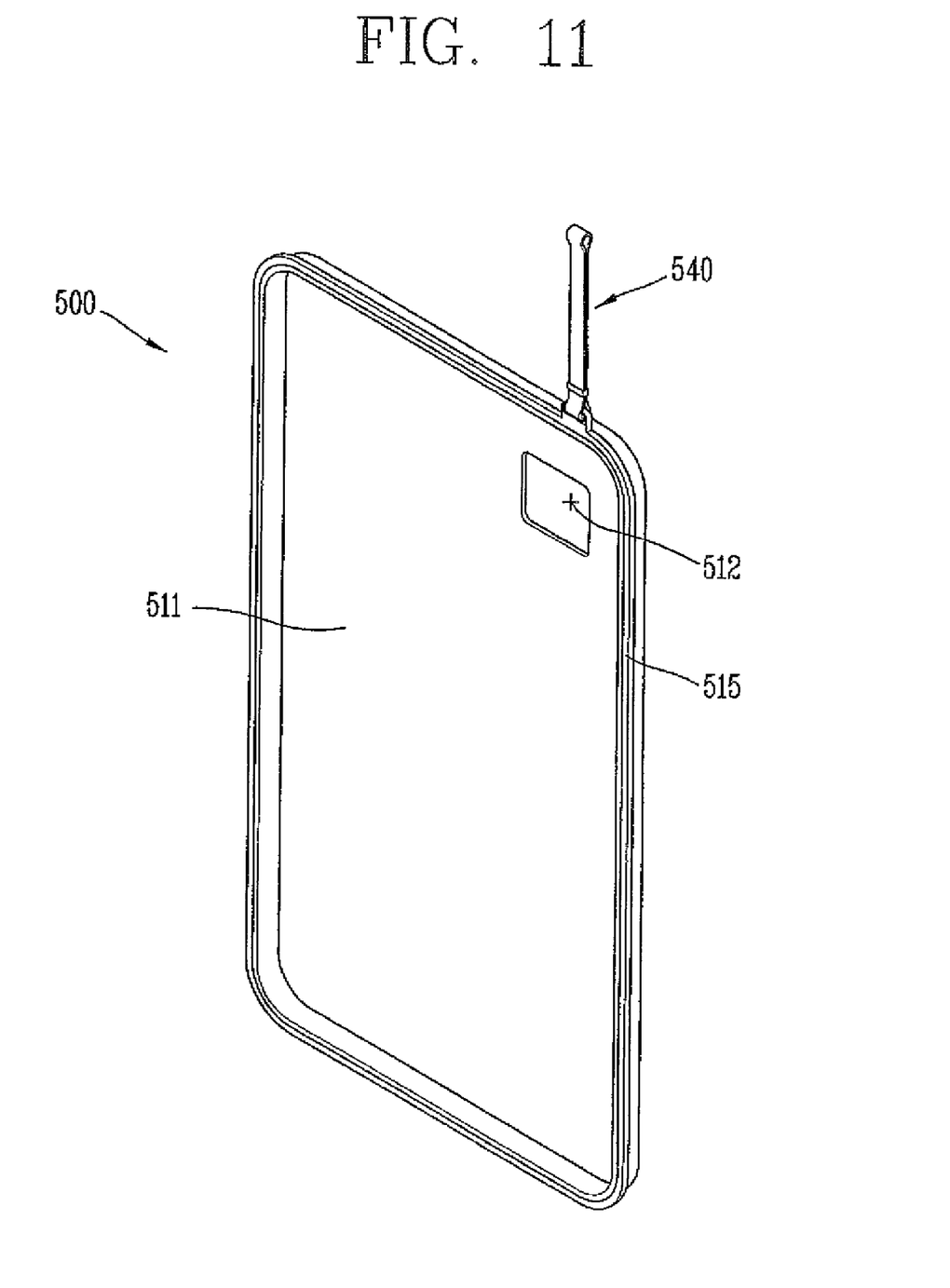

FIG. 11 shows an exemplary casing 500 with a strap 540. An interposal portion 515 may be attached in an annular shape along an outer circumference of the battery cover portion 511. The strap 540 may be detachably mounted to one portion of the interposal portion 515. The strap 540 may be positioned outside the portable terminal 10, such that a user can easily grip the whole portable terminal 10 just by holding the strap 540. In addition, the strap 540 may be useful for hanging the portable terminal 10 from a ring of a bag or the like. Hence, the strap 540 can be provided to assist in the gripping or holding of the portable terminal 10.

Figure 12:
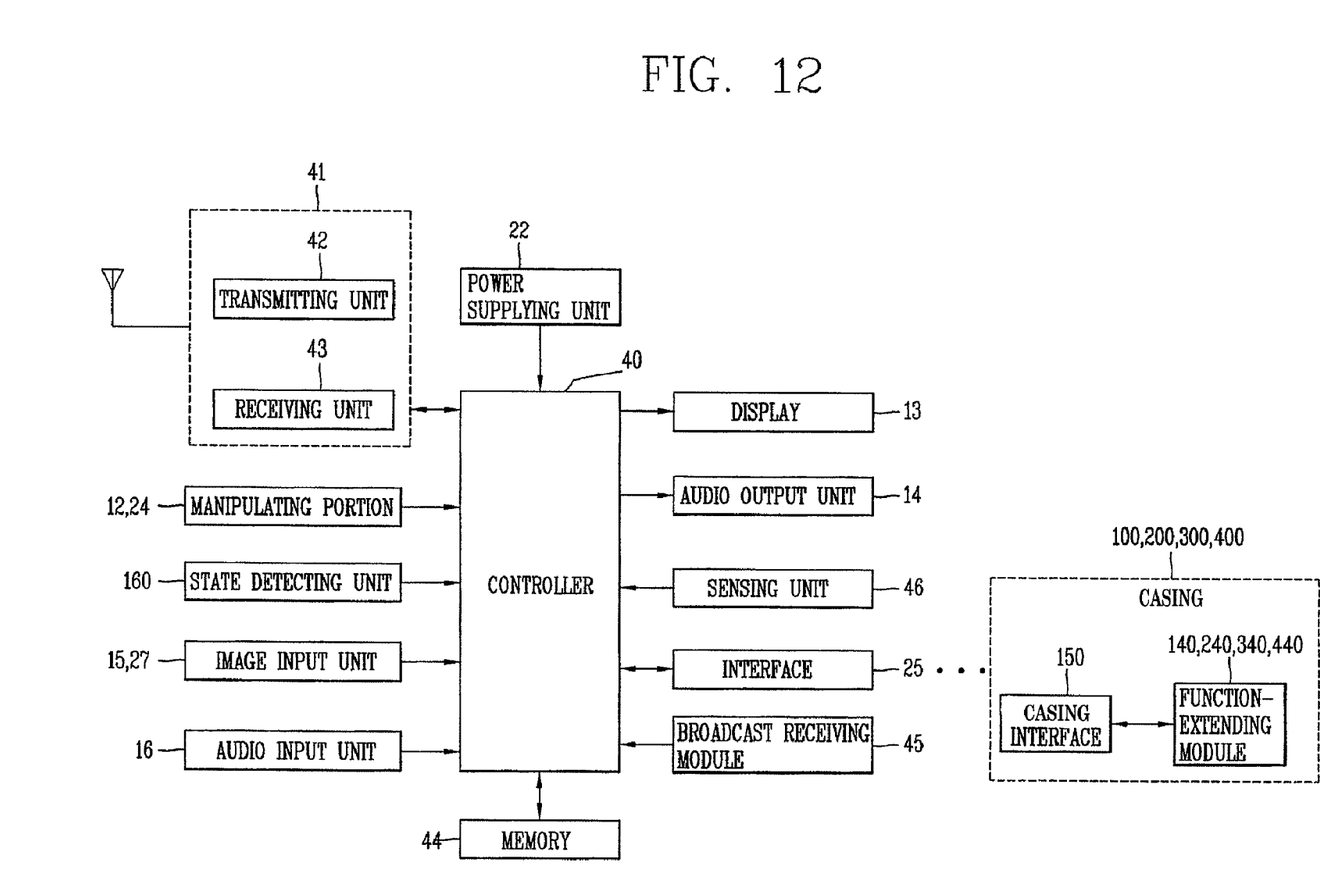
FIG. 12 is a block diagram of a portable terminal according to the present invention.

FIG. 12 is an exemplary block diagram of a portable terminal related to the present invention. Referring to FIG. 12, a portable terminal in accordance with any of the foregoing exemplary embodiments of the present invention may include a radio communication module 41, manipulating portions 12 and 24, image input units 15 and 27, an audio input unit 16, a display 13, an audio output unit 14, a sensing unit 46, an interface 25, a broadcast receiving module 45, a memory 44, a power supplying unit 22, a casing interface 150, a state detecting unit 160, a electronic component 140, 240, 340 or 440, and a controller 40.

The controller 40 generally controls the overall operation of the portable terminal 10. For instance, the controller 40 controls the portable terminal 10 to enable a voice call, a data communication, a telephony call, and the like. The controller 40 may also control operations of the portable terminal 10 related to the present invention, in addition to the control of the general functions.

The radio communication module 41 may transmit/receive a radio signal to/from a mobile communication base station through an antenna. For example, the radio communication module 41 handles transmission and reception of text data, image data and control data under the control of the controller 40. As such, the radio communication module 41 may include a transmitting unit 42 for modulating a signal to be transmitted and transmitting the modulated signal, and a receiving unit 43 for demodulating a signal received by the radio communication module.

The manipulating portions 12 and 24 may be configured as shown in FIG. 1, to provide the controller 40 with key input data inputted by a user to control the operation of the portable terminal 10. The manipulating portions 12 and 24 may be implemented as a dome switch, a touchpad (static pressure/capacitance), a jog wheel, a jog switch, and the like.

The image input units 15 and 27 may process an image frame, such as still image, or a moving image acquired by an image sensor in a telephony call communication mode or an image capture mode. Also, the processed image frame is converted into image data displayable on the display 13 to then be outputted on the display 13. The image frame processed in the image input units 15 and 27 may be stored in the memory 44 or transmitted to the exterior through the radio communication module 41, under the control of the controller 40.

The audio input unit 16 may be configured to receive an external audio signal through a microphone in a call communication mode, a record mode, a voice-recognition mode, and the like, so as to process the sound into an electric sound data. In the call communication mode, such processed sound data is converted into a data format, which is transmittable to the mobile communication base station through the radio communication module 41, so as to be outputted to the radio communication module 41. In the record mode, the processed sound data is stored in the memory 44. Such audio input unit 16 may implement various noise removing algorithms so as to remove noise created when receiving the external audio signal.

The display 13 may display information processed in the portable terminal 10. For example, in case of the portable terminal 10 in the call communication mode, the display 13 may display a user interface (UI) or a graphic user interface (GUI) related to a call under the control of the controller 40. When the portable terminal 10 is in the telephony call communication mode or the image capture mode, the display 13 may display the UI or GUI, or images captured under the control of the controller 40. If the display 13 is configured with a touch screen, the display 13 may be used as an input device as well as the output device.

The audio output unit 14 may convert audio data received from the radio communication module 41 or audio data stored in the memory 44, under the control of the controller 40, in a call signal reception mode, a record mode, a voice-recognition mode, a broadcast reception mode, and the like. Also, the audio output units 14 and 26 may output audio signals related to functions performed in the portable terminal 10 (e.g., call signal reception sound, message reception sound, or the like). Such audio output units 14 and 26 may include a speaker, a receiver, a buzzer, and the like.

The sensing unit 46 may be configured to sense a current state of the portable terminal 10, such as an opened/closed state, a location, whether to be contacted by a user, and the like, so as to generate a sensing signal for controlling the operation of the portable terminal. For example, in case of a slide type portable terminal, the sensing unit 46 senses whether the portable terminal is opened or closed, and outputs the sensing result to the controller 40, thereby controlling the operation of the portable terminal. Also, the sensing unit 46 may handle a sensing function, such as whether power is supplied from the power supplying unit 22, whether an external device is coupled to the interface 25, or the like The interface 25 may serve as an interface through which the portable terminal can be connected to all kinds of external devices, such as wired/wireless headset, portable charger, wired/wireless data port, card socket (e.g., memory cards, SIM/UIM cards, or the like) and the like. Such interface 25 receives data or power from an external device and thereby delivers such data or power to each component in the portable terminal or transmits internal data in the portable terminal to an external device.

The memory 44 may be configured to store programs for processing or controlling the controller 40, or for temporarily store input/output data (e.g., phonebook, message, still images, moving images, or the like). The memory 44 may store a program for controlling the operation of the portable terminal related to the present invention. Such memory 44 may generally include a hard disc, a memory card (e.g., a SD or MD memory, or the like), a flash memory, RAM, ROM, or the like.

The broadcast receiving module 45 receives a broadcast signal transmitted via a satellite or ground wave, converts it into a data format displayable on the display 13, and then outputs the converted data to the controller 40. Also, the broadcast receiving module 45 receives additional data related to broadcasting (e.g., Electric Program Guide (EPG), channel list, or the like). Such broadcast data may be converted in the broadcast receiving module 45 and additional data may be stored in the memory 44.

The power supplying unit 22 may receive applied external power and internal power under the control of the controller 40, and thereby supplies power to each component requiring power for operation. The power supplying unit 22 may exchange power with the electronic component 140, 240, 340, or 440 via the casing interface 150. In some cases, the power supplying unit 22 may be charged by such electronic component 140, 240, 340, or 440.

The electronic component 140, 240, 340 or 440 may exchange data with the portable terminal via the controller 40. Accordingly, functions, such as inputting/outputting data or information to the portable terminal by the electronic component 140, 240, 340 or 440 may be controlled by the controller 40. A state detecting unit 160 may detect information related to an unfolded or folded state of the casing 100, 200, 300, or 400 and delivers the detected information to the controller 40, which then controls the operation related to the state of the casing 100, 200, 300, or 400 based on such information.

For example, when the folded state is detected by the state detecting unit 160, the controller 40 controls the portable terminal such that power for the display 13 can be cut off, but power for the auxiliary display 180 can be applied. In addition, for an input device such as a QWERTY type keypad 130, power is cut off so as to prevent erroneous input in the folded state of the casing 100, 200, 300, or 400. If the casing 100 is in the unfolded state, the controller 40 may control the two displays 13 and 180 in an opposite manner to that described above. The controller 40 may also control an image output direction (rotation) on the display 13 to be converted as it is sensed that the QWERTY type keypad 130 or the gaming keypad 230 is attached via the data terminal 157 (refer to FIG. 7).

The portable terminal having described above is not limited to the configuration and method illustrated in the aforementioned exemplary embodiments, but the features and other characteristics of the exemplary embodiments described herein may be combined in various ways to obtain additional and/or alternative exemplary embodiments.

As the present features may be embodied in several forms without departing from the characteristics thereof, it should also be understood that the above-described exemplary embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed:

1. A casing for a portable terminal, the casing comprising:
a first portion configured to replace a rear cover of a portable terminal so as to provide an exterior surface of the portable terminal;
a second portion connected to the first portion; and
an electronic component located at the second portion, the electronic component being connectable to the portable terminal to provide at least one function associated with the portable terminal,
wherein the electronic component comprises at least one of an auxiliary battery for extending a power supply function of a battery, an auxiliary information processing device for extending an information processing function of the portable terminal, and an auxiliary antenna for extending a radio transmitting/receiving function of the portable terminal.

2. The casing of claim 1, wherein the first portion includes:
a battery cover portion configured to cover the battery mounted in the rear of the portable terminal, the battery cover portion being detachably connectable to the portable terminal; and
an interposal portion coupled to the battery cover portion, the interposal portion being interposable between the battery cover portion and the portable terminal when the battery cover portion is connected to the portable terminal.

3. The casing of claim 2, further comprising a connecting portion configured to connect the interposal portion to the second portion such that the second portion can be folded with respect to the first portion.

4. The casing of claim 1, wherein at least one portion of the first and second portion is formed of leather.

5. The casing of claim 1, wherein the electronic component is configured to provide at least one function associated with an input or an output of the portable terminal.

6. The casing of claim 5, wherein the electronic component includes at least one of a QWERTY type keypad, a gaming keypad, a keypad for playing music, a biometric information detecting sensor, a speaker, and a display.

7. The casing of claim 1, wherein the electronic component is detachably mounted in the second portion.

8. The casing of claim 1, further comprising a casing interface configured to provide data exchange between the electronic component and the portable terminal.

9. The casing of claim 8, wherein the casing interface includes a terminal portion provided at the first portion, the terminal portion being configured to communicate with a terminal of the portable terminal that is exposed only upon removal of a rear cover of the portable terminal.

10. The casing of claim 1, wherein the electronic component is electrically connectable to the battery so as to supply or receive power.

11. The casing of claim 1, wherein the second portion is foldable with respect to the first portion.

12. The casing of claim 1, wherein electronic component includes an auxiliary display disposed on a surface which faces away from said exterior surface when the second portion is folded over a front surface of the portable terminal.

13. A portable terminal comprising:
a main body having a rear portion, the rear portion including an internal terminal; and
a casing detachably coupled to the main body at the rear portion, the casing including:
a first portion defining an exterior surface of the portable terminal;
a second portion connected to the first portion;
a terminal portion connected to the internal terminal of the portable terminal, the internal terminal of the portable terminal being exposed only when the casing is detached from the main body; and
an electronic component located at the first portion, the electronic component being connectable to the terminal portion provided at the first portion,
wherein the electronic component comprises at least one of an auxiliary battery for extending a power supply function of a battery, an auxiliary information processing device for extending an information processing function of the portable terminal, and an auxiliary antenna for extending a radio transmitting/receiving function of the portable terminal.

14. The terminal of claim 13, further comprising a battery in the main body, and
wherein the first portion covers the battery in the main body, and
wherein the second portion is foldable with respect to the first portion so as to cover at least one portion of a front portion of the main body.

15. The terminal of claim 13, wherein at least one opening is formed in at least one of the first and second portions.

16. The terminal of claim 13, wherein the electronic component includes an auxiliary display disposed on a surface of the second portion that does not face the main body when the second portion is folded over the main body.

17. The terminal of claim 13, wherein at least one portion of the first and second portions is formed of leather.

18. The terminal of claim 13, wherein the first portion includes a battery cover portion detachably coupled to the main body so as to cover a battery of the portable terminal by shielding at least one portion of the rear portion of the main body in which the battery is located.

19. The terminal of claim 18, wherein the first portion includes an interposal portion coupled to the battery cover portion, the interposal portion being interposable between the battery cover portion and the portable terminal when the battery cover portion is connected to the portable terminal.

20. The terminal of claim 19, further comprising a connecting portion configured to connect the interposal portion to the second portion such that the second portion can be folded with respect to the first portion.

21. The terminal of claim 13, wherein the electronic component is configured to provide at least one function associated with an input or an output of the portable terminal.

22. The terminal of claim 21, wherein the electronic component includes at least one of a QWERTY type keypad, a gaming keypad, a keypad for playing music, a biometric information detecting sensor, a speaker, and a display.

23. The terminal of claim 13, wherein the electronic component is detachably mounted in the second portion.

24. The terminal of claim 13, wherein the casing further comprises a state detecting unit configured to determine whether the casing is in a folded state or unfolded state.

* * * * *